United States Patent [19]
Carriere et al.

[11] 4,301,016
[45] Nov. 17, 1981

[54] BOREHOLE DRILLING FLUID AND METHOD

[75] Inventors: David B. Carriere, Greeley, Colo.; Rodrigue V. Lauzon, Seabrook, Tex.

[73] Assignee: NL Industries, Inc., New York, N.Y.

[21] Appl. No.: 8,758

[22] Filed: Feb. 2, 1979

[51] Int. Cl.³ ............................................... C09K 7/02
[52] U.S. Cl. ............................ 252/8.5 C; 252/8.5 A; 260/29.6 H
[58] Field of Search ............ 252/8.5 A, 8.5 C, 8.55 R; 260/29.6 H

[56] References Cited

U.S. PATENT DOCUMENTS

| | | | |
|---|---|---|---|
| 2,647,886 | 8/1953 | Seymour | 252/8.5 C X |
| 2,718,497 | 9/1955 | Oldham et al. | 252/8.5 C |
| 2,805,990 | 9/1957 | Bergman | 252/8.5 C |
| 3,025,234 | 3/1962 | Canterino | 252/8.5 C |
| 3,085,977 | 4/1963 | Park et al. | 252/8.5 C |
| 3,734,873 | 5/1973 | Anderson et al. | 260/29.6 H |
| 3,926,891 | 12/1975 | Gross et al. | 260/29.6 E |
| 4,026,932 | 5/1977 | Gross et al. | 260/29.6 H |
| 4,167,502 | 9/1979 | Lewis et al. | 260/29.6 H |

*Primary Examiner*—Herbert B. Guynn
*Attorney, Agent, or Firm*—Browning, Bushman & Zamecki

[57] ABSTRACT

An improved drilling fluid and method for drilling a borehole, the drilling fluid comprising an aqueous dispersion of an emulsion polymerized latex comprised of an interpolymer of an olefinically unsaturated carboxylic acid monomer and at least one other, non-carboxylated polymerizable monomer, the latex being of a type which undergoes rapid increase in viscosity upon the addition of a sufficient amount of a basic material.

19 Claims, 1 Drawing Figure

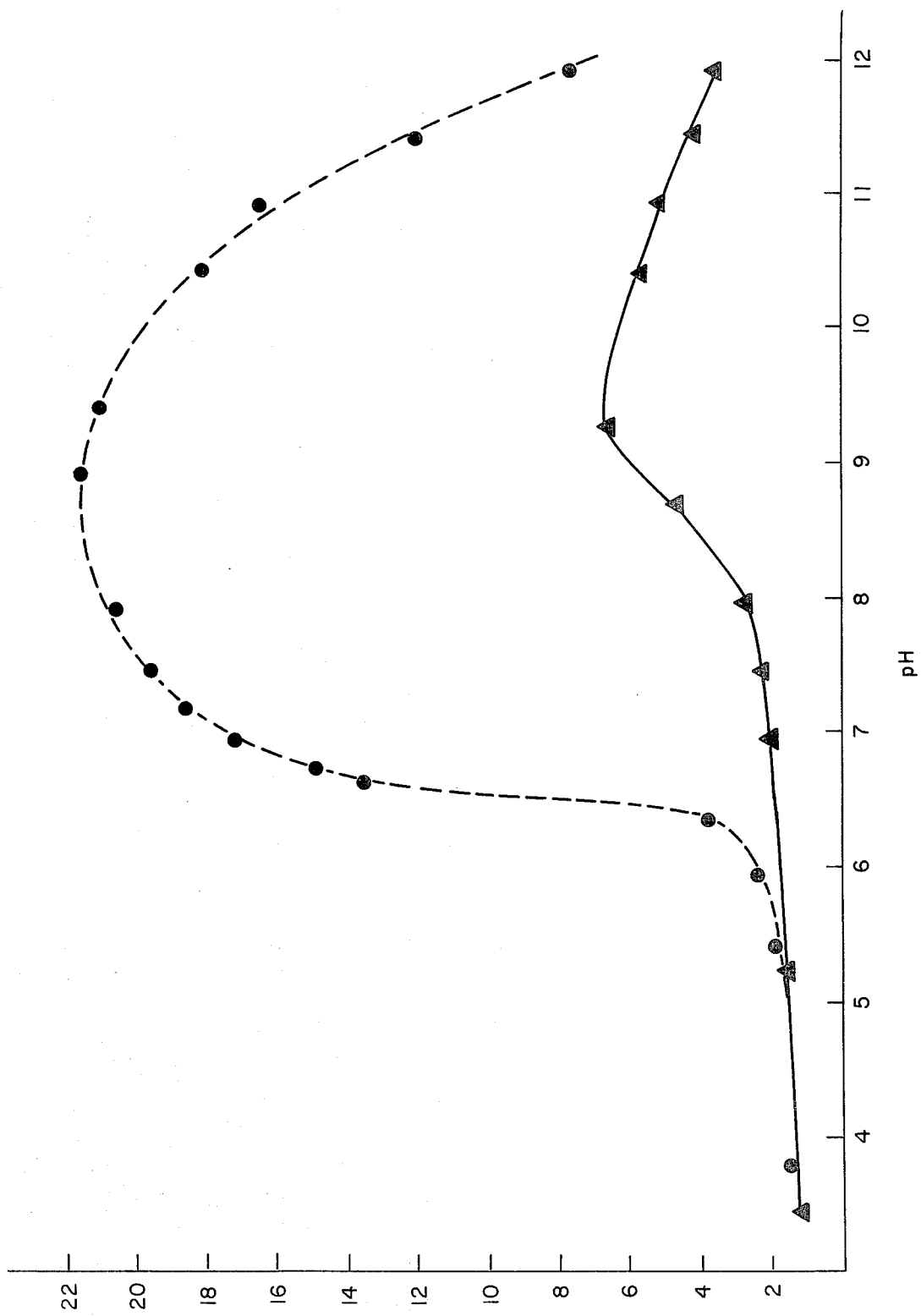

BOREHOLE DRILLING FLUID AND METHOD

BACKGROUND OF THE INVENTION

The present invention relates to improved methods and compositions for drilling boreholes such as oil wells, gas wells or the like.

Drilling fluids used in the drilling of oil wells, gas wells and similar boreholes are commonly aqueous mixtures containing clays or other collodial materials as well as certain other additives which are employed depending on borehole conditions. The drilling fluid serves as a lubricant for the bit and drill stem, as a carrying medium for the cuttings produced by the drill bit, and assists in the formation of a filter cake on the walls of the borehole to minimize fluid losses to the surrounding subsurface strata through which the borehole extends. In most cases, the viscosity of the drilling fluid must be high enough to effectively remove the cuttings from the borehole. On the other hand, excessive viscosities are undesirable because excessive pump pressure is necessary to circulate such high viscosity drilling fluid. Moreover, such excessive pressures in the borehole increase the likelihood of fractures in the subsurface strata leading to a loss of whole drilling fluid to the formation.

The prior art abounds with numerous drilling fluid compositions designed to provide the proper viscosity for the particular borehole drilling application. Generally, in order to achieve and maintain the desired viscosity, the prior art drilling fluids have complex compositions and/or require complex, time consuming formulation procedures in their preparation. Additionally, due to the complex make-up of the drilling fluid and/or the mixing procedures, skilled personnel are required for their preparation. It will be appreciated that there are numerous instances where the ability to rapidly prepare the drilling fluid at the drilling site is not only desirable but expedient. Further, the ability to easily and quickly effect, on-site, large viscosity changes in the drilling fluid can be extremely useful.

SUMMARY OF THE INVENTION

It is therefore an object of the present invention to provide a new and improved drilling fluid.

Another object of the present invention is to provide a new and improved drilling fluid which can be easily and quickly prepared at the drilling site.

A further object of the present invention is to provide a new and improved method of drilling a borehole employing a new and improved drilling fluid.

Still a further object of the present invention is to provide a method of preparing a drilling fluid for use in borehole drilling.

In one embodiment, the present invention provides an improved method for drilling a borehole wherein a drilling fluid is circulated within the borehole druing the drilling. The drilling fluid employed in the improved method comprises an aqueous composition which contains an effective amount of an emulsion polymerized latex comprised of an interpolymer of an olefinically unsaturated carboxylic acid monomer and at least one other, non-carboxylated polymerizable monomer. The emulsion polymerized latex is characterized in that aqueous dispersion of the latex containing 0.5 lbs. of polymer solids per barrel of the dispersion have an API apparent viscosity, in a pH range above about 6, which is at least 300% greater than the API apparent viscosity of the dispersion in a pH range below about 6.

The present invention further contemplates an improved drilling fluid composition comprised of an aqueous carrier such as water, an effective amount of the emulsion polymerized latex described above, a sufficient amount of finely divided solids, e.g. clays, to form a filter cake on the wall of the borehole, and a sufficient amount of a basic material to provide a pH in the drilling fluid of above about 7.

In another embodiment, the present invention provides an improved drilling fluid comprised of an aqueous carrier such as water, an effective amount of the emulsion polymerized latex described above, and an indicating amount of an acid-base indicator which undergoes a color change in an aqueous dispersion of the latex containing 0.5 lbs. of polymer solids per barrel of the dispersion at about the pH where the API apparent viscosity is about at least 150% greater than the API apparent viscosity of the dispersion in a pH range below about 6.

In still another embodiment, the present invention provides a method of preparing a water-based drilling fluid in which the above described emulsion polymerized latex, in an effective amount, is admixed with an aqueous carrier such as water, followed by the addition to the mixture of the aqueous carrier and latex, a basic material in an amount such that the pH of the resulting composition is about 7 or greater and a sufficient amount of finely divided, filter cake forming solids.

BRIEF DESCRIPTION OF THE DRAWING

The single FIGURE shows the relationship between the viscosity and pH of several drilling fluid compositions according to the present invention.

DESCRIPTION OF THE PREFERRED EMBODIMENTS

The latexes which are useful in the drilling fluid composition and method of the present invention are carboxylated or acidic colloidal dispersions made by the emulsion polymerization of various unsaturated monomers with various unsaturated carboxylic acid monomers. The colloidal polymer particles are anionic in nature which at low pH, i.e. below about 6, display a very low viscosity. Upon neutralization with basic materials, the solid polymeric particles swell and macromolecular association occurs with a rapid increase in viscosity. The rapid viscosity increase is accompanied by a change in the polymeric colloid from a hydrophobic state to a hydrophilic state, presumably a result of the ionization of the carboxyl radical as a function of increasing pH.

The latexes contemplated in the present invention, in addition to possessing certain physical properties hereafter described, are those prepared by polymerizing the monomers, in suitable amounts, by emulsion polymerization processes. Emulsion polymerization processes are characterized by the high rate of reaction, which is attributed to the fact that the polymer radicals are located in distinct particles that are separated by water and thus more readily available to the free monomers present, and by the fact that the viscosity within the particle increases rapidly with conversion thus causing a decrease in the rate of diffusion of the macroradicals produced. These two effects serve to reduce the rate of radical termination by recombination and, as a consequence, high molecular weight polymers are produced at high rates of reaction. Typical emulsion polymerization processes for producing the latexes useful in the present invention are disclosed in U.S. Pat. No. 3,865,772 to Hulyalkar and U.S. Pat. No. 4,039,500 to Basset, et al, which are hereby incorporated by reference for all purposes.

The latexes which are useful in the compositions and methods of the present invention, in addition to having the structural features described above, and being formed by emulsion polymerization, are characterized in that the API apparent viscosity of a deionized water dispersion of the latex containing 0.5 lbs. of polymer solids per 42 gallon barrel (ppb) of the dispersion in a pH range above about 6 is at least 300% greater than the API apparent viscosity of the dispersion in a Ph range below about 6. Preferably such an aqueous dispersion of the latex will have a low (less than 5 cps) API apparent viscosity at a pH of 6 or less which increases rapidly in a pH range from about 6 to about 9, preferably from about 6.8 to about 9, and most preferably about 6.8 to about 8. Preferably, the API apparent viscosity of the aqueous dispersion of the latex containing 0.5 ppb polymer solids, in a pH range above about 6, is at least 600% greater than the API apparent viscosity at a pH range less than about 6.

Preferably, the latexes of the present invention are characterized in that an aqueous dispersion of the latex containing 0.5 ppb polymer solids will have a percent light transmittance T (as per Lamberts' law) of less than 40%, preferably less than 25%, in a pH range of 6 or less, which will increase rapidly in a pH range from about 6.2 to about 9, preferably about 6.8 to 9, and most preferably 6.8 to 8. The minimum T attained at or about a pH of 9 should preferably be at least 80%.

Emulsion polymerized latexes having the above described structural make-up and possessing the noted viscosity and, preferably, the light transmittance characteristics, can be used to formulate excellent water-based drilling fluids.

The composition of the drilling fluids of the present invention, as to latex content, can vary quite markedly depending upon the desired viscosity, the downhole conditions encountered, the amount and type of additives such as weighting agents, and other such parameters. Generally, however, the drilling fluid compositions will be comprised of an aqueous carrier, preferably fresh water (as opposed to brackish water or sea water), and some effective amount of the latex which will provide a composition of aqueous carrier plus latex containing up to 2 ppb of polymer solids of the mixture or dispersion. Generally an "effective amount" is an amount of latex which will impart to the drilling fluid the desired viscosifying effect. Preferably, the latex will be present in the drilling fluid so as to provide a polymer solids content of from about 0.25 to about 0.75 ppb (pounds per barrel). Especially desirable drilling fluids are obtained when the latex is present in the drilling fluid an an amount to provide a polymer solids content of around 0.5 ppb.

The latexes which are useful in the drilling compositions and methods of the present invention, as previously noted, can be termed "alkali swellable". More specifically, the latexes are those which undergo rapid viscosity increases when the pH of suitable water-latex compositions are increased from acidic to basic. Generally speaking, the pH of the drilling fluid compositions will be above about 7 and more preferably from about 7 to about 13, especially 7–10. It will be understood that, depending upon the particular type of monomers employed in forming the interpolymers comprising the latexes of the present invention, the precise pH range over which the drilling fluid will have the most desirable rheological properties will vary. Thus, for example, a pH range of between 7 to 9 may be more desirable for latexes comprised of one type of interpolymer, while a pH range from 8 to 10 may be more desirable for latexes comprised of interpolymers of different monomers.

The latexes of the present invention can be produced from a variety of monomers and can incorporate, with advantage, crosslinking agents. The interpolymers which comprise the latexes of the present invention and which are formed in an emulsion polymerization process must contain at least one polymerizable carboxylic acid monomer and at least one non-carboxylated unsaturated monomer which is copolymerizable with the carboxylic acid monomer(s). The term "non-carboxylated", as used herein, refers to compounds which do not have a free carboxylic acid group, i.e. —COOH or an acid anhydride grouping formed by the elimination of one molecule of water from two carboxylic acid groups located on the same polycarboxylic acid molecule. Thus, virtually any polymerizable monomer which can be emulsion polymerized with a carboxylic acid monomer to produce a latex having the physical properties hereinabove described can be employed.

The carboxylic acid monomers useful in the production of the interpolymers comprising the latexes used in the present invention are the olefinically unsaturated carboxylic acids containing at least one activated carbon-to-carbon olefinic double bond, and at least one carboxyl group, i.e. an acid containing an olefinic double bond which readily functions in polymerization because of its presence in the monomer molecule either in the alpha/beta position with respect to a carboxyl group thusly,

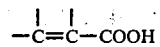

or as a part of a terminal methylene grouping thusly,

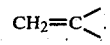

In the alpha/beta acids the close proximity of the strongly polar carboxyl group to the double-bonded carbon atoms has a strong activating influence rendering the substances containing this structure very readily polymerizable. The presence of a terminal methylene grouping in a carboxylic monomer makes this type of compound much more easily polymerizable than if the double bond were intermediate in the carbon structure. Olefinically-unsaturated acids of this class include such widely divergent materials as the acrylic acids typified by acrylic acid itself, methacrylic acid, ethacrylic acid, alpha-chloro-acrylic acid, beta methyl-acrylic acid (crotonic acid), alpha-phenyl acrylic acid, beta-acryloxy propionic acid, sorbic acid, alpha chloro sorbic acid, itaconic acid, citraconic acid, mesaconic acid, glutaconic acid, aconitic acid, maleic acid, fumaric acid and tricarboxy ethylene. As used herein, the term "carboxylic acid monomer" includes the polycarboxylic acids and those acid anhydrides, such as maleic anhydride, wherein the anhydride group is formed by the elimination of one molecule of water from two carboxyl groups located on the same polycarboxylic acid molecule. Anhydrides of the types formed by elimination of water from two or more molecules of the same or different unsaturated acids, such as acrylic anhydride, are not included because of the strong tendency of their polymers to hydrolyze in water and alkali. Maleic anhydride and the other acid anhydrides useful herein have the general structure

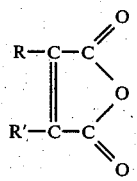

wherein R and R' are selected from the group consisting of hydrogen, halogen, hydroxyl, alkyl, aryl, alkaryl, aralkyl and cycloalkyl groups, such as methyl, ethyl, propyl, octyl, decyl, phenyl, tolyl, xylyl, benzyl, cyclohexyl and the like.

The preferred carboxylic acid monomers for use in this invention are the monoolefinic acrylic acids having the general structure:

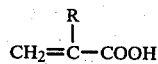

wherein R is a substituent selected from the class consisting of hydrogen, monovalent alkyl radicals, monovalent aryl radicals, monovalent aralkyl radicals, monovalent alkaryl radicals and monovalent cycloaliphatic radicals. Of this class, acrylic acid and methacrylic acid are most preferred because of their generally lower cost, ready availability and ability to form superior polymers.

The amount of carboxylic acid monomer in the interpolymer is generally in the range from about 10% to 70% by weight, preferably 20% to 70%. Thus, the equivalent weight of the polymers is in the range from about 100 to about 700, preferably 125 to 650, most preferably 125 to 400. The equivalent weight is herein defined as the weight of polymer solids requiring an equivalent weight of alkali for neutralization.

Representative of the non-carboxylated unsaturated monomers which are copolymerizable with the carboxylic acid monomers to form the interpolymers of the latexes of the present invention include compounds having the general formula:

wherein $R_1$ is a member of the class consisting of alkyl groups having from 1 to 30 carbon atoms and $R_2$ is hydrogen or a methyl group. Also useful are compounds having the general formula:

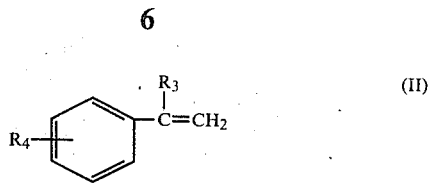

wherein $R_3$ is hydrogen or a methyl group and $R_4$ is selected from the class consisting of hydrogen and alkyl groups having from 1 to 4 carbon atoms. Non-limiting examples of compounds having the general formula II include styrene, alpha-methyl-styrene, vinyl toluene and the like. Other useful monomers are monoolefinics having from 2 to 4 carbon atoms such as ethylene, propylene, butylene, isobutylene as well as compounds having the general formula:

wherein $R_5$ is an alkyl group having from 1 to 4 carbon atoms. Non-limiting examples of compounds having the general formula III include vinyl methyl ether, vinyl ethyl ether, vinyl butyl ether. Compounds having the general formula:

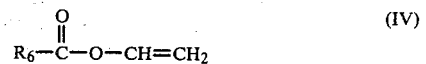

wherein $R_6$ is an alkyl group having from 1 to 4 carbon atoms can also be employed. Non-limiting examples of compounds having the general formula IV include vinyl acetate, vinyl propionate, vinyl butyrate and the like. Conjugated diolefins containing from 4 to 8 carbon atoms such as butadiene, 1,3-hexadiene, 1,3-octadiene, and the like as well as mixtures of various of the above enumerated compounds can be used.

Of the above described non-carboxylated, unsaturated monomers useful in preparing the interpolymers of the latexes of the present invention, a particularly desirable group of compounds are the acrylic ester monomers represented by formula I, particularly those in which $R_1$ is an alkyl group having from 1 to 22 carbon atoms. Non-limiting examples of such alkyl acrylic esters include methyl acrylate, ethyl acrylate, butyl acrylate, hexyl acrylate, decyl acrylate, lauryl acrylate, stearyl acrylate, behenyl acrylate, methyl methacrylate, ethyl methacrylate, lauryl methacrylate, stearyl methacrylate, behenyl methacrylate and mixtures thereof. Especially preferred monomers are methyl acrylate, ethyl acrylate, methyl methacrylate and mixtures thereof.

The non-carboxylated monomers will generally be present in the interpolymers in amounts of from about 30 to about 80% by weight. This is particularly true when the non-carboxylated monomer comprises the preferred acrylic acid esters noted above.

Optionally, the emulsion polymerization is carried out in the presence of a crosslinking agent comprising a polymerizable compound having a polymerizable

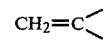

grouping and at least one other polymerizable grouping, said groups being non-conjugated with respect to each other. These crosslinking agents are typified by allyl acrylate, methallyl methacrylate, diallyl malonate, divinyl ether, glycol diacrylate (ethylene diacrylate), glyceryl triacrylate, and divinyl benzene. A useful crosslinking material is a polyalkenyl polyether of a polyhydric alcohol containing more than one alkenyl ether grouping per molecule, the parent polyhydric alcohol containing at least four carbon atoms and at least three hydroxyl groups typified by polyallyl sucrose. When the optional crosslinking agent is present, polymeric mixtures containing about 0.05% to about 20% by weight of crosslinking monomer based on the total weight of monomers present, preferably 0.1% to 15% by weight, are employed. The amount of crosslinking monomer should be such that the enhanced swelling of the colloidal polymeric particles when contacted with a base is not appreciably decreased, whereas the solubility of the particles is decreased at pH values in excess of that required for maximum swelling of the particles.

Especially preferred latexes contain polymers comprising from about 20% to about 70% by weight of a carboxylic monomer selected from the group consisting of acrylic acid, methacrylic acid, and mixtures thereof, and from about 30% to about 80% by weight of one or more alkyl esters of acrylic acid containing from 1 to 22 carbon atoms in the alkyl group, most preferably selected from the group consisting of methyl acrylate, ethyl acrylate, methyl methacrylate and mixtures thereof.

Although, as can be seen above, there are a great number of interpolymers which are useful in the latexes used in the compositions and methods of the present invention, a particularly desirable drilling fluid can be formed from a commercially available latex formulation containing an interpolymer of about 60% by weight methacrylic acid, and about 34% ethyl acrylate. The particular latex known as ALCOGUM L-21 is marketed by Alco Chemical Corporation, Trenton Avenue and Williams Street, Philadelphia, Penna. 19134. ALCOGUM L-21 has the following physical properties:

| Property | |
|---|---|
| Total Solids[1] | 20.0 ± .5 |
| pH | 2.6 |
| Viscosity[2] | 55 |
| Emulsion Type | anionic |
| Equivalent Weight[3] | 130 |
| Density | 1.05 |
| Appearance | milky white liquid |

[1] Weight percent, specification, other values are typical
[2] Brookfield, 20 rpm, spindle #2, @25° C.
[3] Weight of Polymer solids requiring an equivalent weight of alkali (e.g. 35 lbs. of ammonium hydroxide, active basis)

The average molecular weight of the polymer in the latexes will generally be within the range from about 500,000 to about 7,000,000, preferably from about 1,000,000 to about 6,000,000 and most preferably from about 2,000,000 to about 4,000,000 as determined from the intrinsic viscosity of the polymer. (See Polymer Science, USSR 12, 702–709, (1970)).

The latexes may optionally contain anti-foaming additives such as silicone defoamers, aliphatic alcohols having 8–20 carbon atoms, aliphatic fatty acids containing 8–20 carbon atoms and the like. The latexes may also contain an organic solvent freezing point depressant such as the lower molecular weight alcohols, glycols, glycol ethers and the like. Representative solvents include methanol, ethanol, isopropanol, butanol, ethylene glycol, propylene glycol, butylene glycol, diethylene glycol, ethylene glycol mono ethyl ether, ethylene glycol mono butyl ether, diethylene glycol mono ethyl ether, diethylene glycol mono butyl ether, ethylene glycol dimethyl ether and the like.

The drilling fluids of the present invention can be easily and quickly prepared at the borehole drilling site by personnel having a minimum of skill. The latexes which are in the form of an aqueous, colloidal dispersion of solid polymeric particles, are admixed, in an appropriate amount, with sufficient water to bring the polymer solids content of the drilling fluid to the desired level. This admixing of the latex with the water carrier can be conveniently carried out in conventional mud pits available at the drill site. The pH of the mixture of water and the latex is then adjusted to the appropriate range depending upon the nature of the interpolymer which comprises the latex. It will be appreciated that, as prepared, the latexes which are useful in preparing the drilling fluids of the present invention will be acidic in nature, generally having a pH in the range of 2 to 4. Drilling fluids prepared using such latexes, while perhaps less acidic, will still be well below a pH of 7. To bring the pH of the drilling fluid to the desired level, a basic material, either in dry form or an aqueous solution, is added to the latex-water mixture, mixing of the components being conducted in the mud pits or other mixing vessel.

Virtually any mono basic alkali material will suffice to adjust the drilling fluid to the proper pH. Generally speaking, the only requisites of the basic materials used to adjust and control the pH of the drilling fluid are that they be sufficiently soluble in the drilling fluid to react with the polymer to provide the viscosifying effect and be compatible with other additives which may be incorporated into the drilling fluid. Typical basic materials include alkali metal hydroxides such as sodium and potassium hydroxide; ammonium hydroxide; sodium carbonate; diammonium phosphate, etc. Especially preferred, because of their ready availability and solubility in water, are the alkali metal hydroxides, particularly sodium hydroxide. While the basic material can be added, in the solid form, to the drilling fluid, it may be desirable to first dissolve the basic material, e.g. the sodium hydroxide, in water and then add the sodium hydroxide solution to the drilling fluid to obtain the desired pH. Drilling fluids containing potassium hydroxide or diammonium phosphate have improved shale stabilizing properties.

Drilling fluids which display low A.P.I. filtrate or fluid loss, inhibit the dispersion of formation clays generated during the drilling operation and have excellent rheological properties can be produced from an aqueous carrier such as water, the alkali sensitive latexes disclosed herein, and suitable amounts of finely divided solids which can be suspended in the drilling fluid and which are capable of forming a filter cake on the borehole wall. It is a particular feature of the present invention that such finely divided solids, which are generally argillaceous in nature, need only be used in relatively small amounts to achieve the desired low A.P.I. filtrate. In fact, drilling fluids exhibiting excellent low A.P.I. filtrate are achieved by commencing the drilling of a drilling fluid comprised basically of water and the alkali sensitive latex at a proper pH and employing the clay particles generated during the borehole drilling as the finely divided solids. As the drilling continues, the clay formations encountered serve to provide the finely divided solids needed to form a filter cake on the borehole wall. Generally, however, when it is desired or necessary to ensure that fluid loss is controlled, the finely divided solids, e.g. the argillaceous material, is incorporated into the drilling fluid prior to commencement of the drilling. The finely divided solids which can be incorporated into the compositions of the present invention can comprise virtually any solid material which can be dispersed or suspended in the drilling fluid which will not deleteriously affect the rheological properties of the drilling fluid, or will not react chemically with the latex composition. Generally speaking, and in the preferred case, the finely divided solids are argillaceous or clay solids. Such clay solids include bentonite, montmorillonite clays, attapulgus clays, P95 rotary clay, mica, shale and mixtures thereof, bentonite being the clay of preference. Generally speaking, the finely divided solids have a size such that at least about 90% will pass through a 325 mesh screen although, depending upon downhole conditions, a different size range of the suspended solids may be employed. As previously noted, it is also possible that the finely divided solids may be comprised of mixed clays and other sub-surface finely divided solids generated, in situ, in the borehole drilling operation.

Since the rheological properties of the drilling fluids of the present invention are pH dependent, useful compositions can be formed by admixing into the drilling fluids prepared from the latexes, an acid-base indicator, the indicator being in an amount sufficient to visually indicate when the desired pH or pH range has been achieved. Generally speaking, the acid-base indicator will be of a type which will change color at a pH about where the apparent viscosity of an aqueous mixture of the latex containing up to 2 ppb of polymer solids is approximately 150% of the viscosity of such a mixture at a pH range below about 6. Preferably, the indicator should undergo a color change in a pH range of about 1 to 2 pH units, the color change commencing at a pH slightly greater than the pH where the aqueous mixture of the latex exhibits a rapid increase in viscosity. As a point of reference, the $pK_a$ of the carboxylic acid latexes of the present invention can be defined as the pH at the mid-point of the pH range over which the aqueous dispersion of the latex rapidly changes apparent viscosity at a concentration of about 0.5 ppb of polymer solids. Thus, ideally, the indicator will exhibit a color change at a pH which is slightly in excess of the $pK_a$. It will be appreciated that the acid-base indicator can be used in drilling fluids with or without filtrate control solids. Non-limiting examples of indicators which may be used, together with the pH range over which the indicators change color and the color changes are as follows:

| INDICATOR | Approximate pH Range | Color Change |
|---|---|---|
| Bromothymol Blue | 6.0–7.6 | Yellow to Blue |
| Phenol Red | 6.6–8.0 | Yellow to Red |
| Cresol Red | 7.0–8.8 | Yellow to Red |
| Metacresol Purple | 7.4–9.0 | Yellow to Purple |
| Thymol Blue | 8.0–9.6 | Yellow to Blue |
| Phenolphthalein | 8.2–10.0 | Colorless to Pink |
| Thymolphthalein | 9.4–10.6 | Colorless to Blue |

A feature of the drilling method of the present invention is that by lowering the pH from a basic pH to an acidic pH, in drilling fluids having a low clay content, there occurs a drastic lowering of viscosity. This makes the drilling fluid particularly useful when it is desired to periodically flush out the well with a low viscosity fluid or to remove the drilling fluid from the well at the termination of the drilling operation. Since acidification of the drilling fluids reduces their viscosity, they can be much more easily pumped and at a much higher rate from the borehole than can drilling fluids of higher viscosities. Thus, if a high circulation rate of drilling fluid is desired with minimal pumping pressure, it is only necessary to acidify the drilling fluid. The drilling fluids can be acidified with virtually any mineral or organic acid. Non-limiting examples of mineral acids include HCl, $H_2SO_4$, $HNO_3$, $H_3PO_4$, etc. Suitable organic acids include formic acid, acetic acid, propionic acid, lactic acid, citric acid, etc. Because of their tendency to minimize coagulation of the latex, the weak organic acids are preferred.

To more fully illustrate the present invention, the following non-limiting examples are presented. Unless otherwise indicated, all physical property measurements were made in accordance with testing procedures set forth in STANDARD PROCEDURE for TESTING DRILLING FLUIDS API RP 13B Seventh Edition, April, 1978. All amounts specified above and in the examples are in pounds per barrel (ppb) unless otherwise specified. Latex concentrations are expressed in ppb of polymer solids.

The physical property parameters referred to in the Examples, unless otherwise specified, are in units expressed as follows:

AV = API Apparent Viscosity (cps) at 600 rpm
PV = Plastic Viscosity (cps) according to Bingham model
YP = Yield Point (lbs/100 ft$^2$) according to Bingham model
API Filtrate = mls as per API RP 13B
FL = fluid loss (ml)

Example I

A drilling fluid was prepared using the alkali sensitive latex ALCOGUM L-21 (hereafter L-21) which is a copolymer of ethyl acrylate and methacrylic and containing about 66% by weight methacrylic acid. A 0.25 wt. % dispersion of the L-21 latex in water was made up and titrated with 1.0M NaOH. The drilling fluid thus prepared contained 0.87 ppb of polymer solids and displayed the following rheological responses:

TABLE I

| pH | AV | PV | YP | $\tau_0$[1] | $\eta_\infty$[2] |
|---|---|---|---|---|---|
| 6 | 6.3 | 5.1 | 2.3 | 12.4 | 4.0 |
| 7 | 33.0 | 21.9 | 22.1 | 50.5 | 13.8 |
| 8 | 36.0 | 22.6 | 26.8 | 58.2 | 13.5 |
| 9 | 35.9 | 22.3 | 27.2 | 59.1 | 13.2 |
| 10 | 23.8 | 14.5 | 18.5 | 49.4 | 8.4 |
| 11 | 19.3 | 13.0 | 12.5 | 37.3 | 8.4 |
| 12 | 10.1 | 7.6 | 4.9 | 18.6 | 5.9 |

[1] Casson slope of $\sqrt{VISC.}$ vs. $\sqrt{1/r.p.m.}$ which estimates degree of shear-thinning.
[2] Limiting high shear viscosity determined from Casson Intercept.

As can be seen from Table I, the drilling fluid showed an immediate viscosity enhancement at pH 7 and stable shear-thinning rheology in the range of pH from 7 to 10. This pH region would be preferred, in this case, for using such a system as a normal viscosity drilling fluid. Such a fluid would have the advantage of a low solids content and could be used as a completion or workover fluid. The drilling fluids of this example had no API filtrate control and the gel strength (torque reading at 3 rpm) was essentially zero.

Example 2

The ALCOGUM L-21 latex used in Example 1 was used to prepare a water based drilling fluid containing about 0.7 ppb of polymer solids. The drilling fluid was neutralized to pH 9 with 1 M KOH. The viscous fluid was then "re-thinned" by adding 1 M acetic acid. The following table shows the decrease in the 600 rpm apparent viscosity as a function of pH:

| pH  | AV   |
| --- | ---- |
| 9.0 | 38.3 |
| 8.5 | 31.3 |
| 8.0 | 27.8 |
| 7.5 | 23.8 |
| 7.0 | 19.8 |
| 6.8 | 17.8 |

EXAMPLE 3

Although these colloidial polymer solutions or mixtures of aqueous carriers such as water and the disclosed latexes do not exhibit filtrate control or gel strength, such properties can be achieved by the addition of small concentrations of finely divided solids. In this example various amounts of bentonite clay were added to water and dispersed using a mixer. After dispersion, an amount of L-21 latex was added to give a final concentration of 0.5 ppb of polymer solids (0.143 wt. %). The formulation was agitated on a magnetic stirrer and neutralized to pH 9 with 1 M NaOH. Table II shows the effect of clay concentration on the drilling fluid properties.

TABLE II

| Clay (ppb) | AV   | PV   | YP   | API Filtrate | 10 sec./10 m. Gel Strength |
| ---------- | ---- | ---- | ---- | ------------ | -------------------------- |
| 3          | 26.5 | 17   | 19   | 20.2 mls.    | 2.0/2.0                    |
| 6          | 33.5 | 21   | 25   | 14.2         | 4.0/4.0                    |
| 9          | 45.5 | 25   | 41   | 13.0         | 11.0/11.0                  |
| 12         | 63.3 | 34.5 | 57.5 | 9.4          | 19.0/19.0                  |

The decrease in fitrate was not due only to the clay since a 10 ppb clay fluid with no alkali sensitive latex (L-21) prepared the same way yielded an API filtrate of 21.1 mls. Since drilling fluids containing the L-21 latex alone show no filtrate control (See Example 1), the results show there is a synergistic interaction between the clay and the alkali sensitive latex (L-21) vis-a-vis filtrate control. It was also found, as seen above and hereafter, that sufficient gel strength can be achieved with proper ratios and concentrations of clay and latex polymer solids.

EXAMPLE 4

To show that even at lower concentrations of the alkali sensitive latex (L-21), there is a synergistic interaction between the clay and latex, the procedure of Example 3 was repeated using a drilling fluid containing 0.1 ppb of the polymer solids. The results are shown in Table III below.

TABLE III

| Clay (ppb.) | AV   | PV   | YP   | API Filtrate | 10 sec./10 m. Gel |
| ----------- | ---- | ---- | ---- | ------------ | ----------------- |
| 3           | 2.8  | 2.5  | 0.5  | 24.0         | 0/0               |
| 6           | 3.5  | 3    | 1    | 17.4         | 0/0               |
| 9           | 5    | 4    | 2    | 14.5         | 0/0               |
| 12          | 9    | 7    | 4    | 13.0         | 0.5/0.5           |
| 15          | 12.5 | 10.5 | 4    | 12.1         | 0.5/1             |
| 18          | 21.3 | 15.5 | 11.5 | 10.7         | 2/4               |
| 21          | 33.5 | 24   | 19   | 10.1         | 4/11              |
| 24          | 54   | 36   | 36   | 8.8          | 8.29              |

As can be seen from Table III, at clay concentrations as low as 6 ppb, the clay-latex drilling fluids exhibit better filtrate control than a drilling fluid containing only latex (See Example I) or a drilling fluid containing 10 ppb clay alone (See Example 3).

EXAMPLE 5

At medium concentrations of the bentonite clay (10 ppb), drilling fluids employing the alkali sensitive latexes exhibit rapid viscosity enhancement during neutralization. Rheological properties and filtrate control are also significantly affected. The following properties were determined on drilling fluids at various concentrations of the L-21 latex and at pH 9:

TABLE IV

| Latex (ppb) | AV   | PV  | YP  | 10 sec./10 min. Gel | API Filtrate |
| ----------- | ---- | --- | --- | ------------------- | ------------ |
| None        | 3.3  | 2.5 | 1.5 | 1/1                 | 21.1 mls.    |
| 0.01        | 5.3  | 4   | 2.5 | 1/3                 | 19.3         |
| 0.02        | 5.5  | 4.5 | 2   | 1/1                 | 18.2         |
| 0.11        | 6.8  | 5   | 3.5 | 1/1                 | 13.9         |
| 0.21        | 10.3 | 8   | 4.5 | 1/1                 | 12.6         |

EXAMPLE 6

The advantage of preparing drilling fluids using the alkali sensitive latexes of the present invention as opposed to other viscosifiers is shown in this example. Four aqueous dispersions were made up as follows:
1. 350 mls. of $H_2O + 0.53$ gm. (polymer solids) of alkali sensitive latex (L-21).
2. 350 mls. of $H_2O + 22.5$ gms. of bentonite clay.
3. 350 mls. of $H_2O + 1.47$ gms. of guar gum.
4. 350 mls. of $H_2O + 0.69$ gms. of sodium carboxymethylcellulose.

Each viscosifier was introduced into the water phase and the mixture sheared for 10 seconds. The dispersions were then adjusted to pH 8, resheared for 10 secs., and screened through a 32 mesh (420 microns) sieve. The residue was dried and weighed while the screened solution was retained for rheology and turbidimetric measurements. The results are shown in Table V.

TABLE V

| Viscosifier | % Transmittance at 540 nm | % Residue | AV   |
| ----------- | ------------------------- | --------- | ---- |
| Latex       | 93                        | 0         | 15.8 |
| Clay        | 0                         | 32        | 8.5  |
| Guar        | 38                        | 1.4       | 8.8  |
| CMC         | 98                        | 55        | 5.8  |

The concentration of each viscosifier was chosen to yield about 15 cps. of viscosity. Only the drilling fluid containing the L-21 alkali sensitive latex yielded this viscosity in the mixing procedure used. This example clearly demonstrates the ease with which rapid viscosity enhancement of a drilling fluid can be achieved using simplified mixing procedures.

EXAMPLE 7

As noted, the interpolymer forming the latexes that are useful in the compositions and methods of the present invention can be made of various monomers but are all carboxylated and their viscosity and colloidal characteristics vary with pH. The drawing shows the relationship of viscosity as a function of pH for two drilling fluids made with the latexes disclosed herein. The polymer solids concentration used in each case is 0.5 ppb in deionized water. The circles denote the L-21 latex. The triangles represent a styrene/butadiene/vinyl acid terpolymer latex. Both systems show enhanced viscosity with increasing pH. The L-21 latex, however, has stronger carboxyl functionality, a lower pKa, and viscosifies at a lower pH range. Thus, the L-21 latex would be preferred in preparing a drilling fluid since less caustic is needed to achieve desired viscosities and natural buffers from the downhole formation tend to equilibrate the fluid at pH 8 to 9.

EXAMPLE 8

This example shows the effects of various bases, in varying amounts on the viscosity of drilling fluids comprising water and differing concentrations of L-21 latex. The data is reported in Tables VI, VII, VIII and IX below.

TABLE VI

| ppb ALCOGUM L-21 | pH | NaOH | | | KOH | | | NH₄OH | | |
|---|---|---|---|---|---|---|---|---|---|---|
| | | AV | PV | YP | AV | PV | YP | AV | PV | YP |
| 0.25 | 6 | 6 | 5 | 2 | 5 | 4 | 1 | 7 | 6 | 2 |
| 0.25 | 7 | 33 | 22 | 22 | 32 | 22 | 19 | 25 | 18 | 14 |
| 0.25 | 8 | 36 | 23 | 27 | | | | 32 | 22 | 20 |
| 0.25 | 9 | 36 | 22 | 27 | 35 | 21 | 28 | 43 | 27 | 31 |
| 0.25 | 10 | 24 | 14 | 19 | | | | 25 | 16 | 18 |
| 0.25 | 10.4 | | | | 29 | 18 | 22 | | | |
| 0.25 | 11 | 19 | 13 | 12 | | | | 13 | 9 | 8 |
| 0.25 | 12 | 10 | 8 | 5 | 11 | 9 | 5 | | | |

TABLE VII

| ppb ALCOGUM L-21 | pH | NaOH | | | KOH | | | NH₄OH | | |
|---|---|---|---|---|---|---|---|---|---|---|
| | | AV | PV | YP | AV | PV | YP | AV | PV | YP |
| 0.5 | 6 | 36 | 26 | 20 | 10 | 10 | 0 | 10 | 9 | 2 |
| 0.5 | 7 | | | | 62 | 38 | 50 | 73 | 47 | 53 |
| 0.5 | 7.2 | 64 | 37 | 55 | | | | | | |
| 0.5 | 8 | 52 | 30 | 46 | 41 | 29 | 44 | 82 | 49 | 65 |
| 0.5 | 9 | | | | | | | 43 | 25 | 36 |
| 0.5 | 9.2 | | | | 43 | 24 | 38 | | | |
| 0.5 | 9.4 | 44 | 25 | 38 | | | | | | |
| 0.5 | 10 | | | | | | | 30 | 20 | 20 |
| 0.5 | 10.2 | 38 | 23 | 30 | | | | | | |
| 0.5 | 10.8 | | | | 38 | 22 | 33 | | | |
| 0.5 | 11 | 35 | 22 | 28 | 37 | 22 | 30 | 24 | 17 | 16 |
| 0.5 | 12 | 25 | 18 | 15 | 27 | 18 | 19 | 12 | 9 | 6 |

TABLE VIII

| ppb ALCOGUM L-21 | pH | NaOH | | | KOH | | |
|---|---|---|---|---|---|---|---|
| | | AV | PV | YP | AV | PV | YP |
| 0.75 | 6 | 58 | 38 | 40 | 15 | 13 | 5 |
| 0.75 | 7 | 80 | 45 | 72 | | | |
| 0.75 | 8.3 | 61 | 34 | 54 | | | |
| 0.75 | 10.2 | 57 | 32 | 50 | | | |
| 0.75 | 11 | 53 | 30 | 46 | | | |
| 0.75 | 11.5 | | | | 54 | 31 | 45 |
| 0.75 | 12 | 41 | 26 | 31 | | | |

TABLE IX

| ppb ALCOGUM L-21 | pH | Na₂CO₃ | | |
|---|---|---|---|---|
| | | AV | PV | YP |
| 0.30 | 3.83 | 1.25 | 1.0 | 0.5 |
| 0.30 | 6.12 | 3.0 | 2.5 | 0.75 |
| 0.30 | 6.16 | 8.75 | 7.5 | 2.5 |
| 0.30 | 6.32 | 13.5 | 10.5 | 6.0 |
| 0.30 | 6.52 | 16.25 | 13.0 | 6.5 |
| 0.30 | 6.72 | 18.0 | 14.0 | 8.0 |
| 0.30 | 6.93 | 19.75 | 15.0 | 9.5 |
| 0.30 | 7.13 | 21.75 | 16.0 | 11.5 |
| 0.30 | 7.36 | 21.25 | 15.5 | 11.5 |
| 0.30 | 7.81 | 18.75 | 13.50 | 10.5 |
| 0.30 | 8.56 | 16.75 | 12.0 | 9.5 |
| 0.30 | 9.19 | 14.0 | 10.0 | 8.0 |
| 0.30 | 9.45 | 13.0 | 9.5 | 7.0 |
| 0.30 | 9.61 | 12.25 | 9.5 | 5.5 |

EXAMPLE 9

The effect of decreasing the pH of a water-based drilling fluid prepared using L-21 latex is shown in this example. In all cases, the drilling fluid contained 0.2 wt. % of the latex (0.70 ppb of polymer solids). The results, shown in Table X below, demonstrate that the viscosity of the drilling fluid can be drastically lowered by the addition of either weak organic or strong mineral acids. The ability to easily and quickly lower the viscosity of the drilling fluid means that when the drilling operation is completed, the drilling fluid in the borehole can be easily removed.

TABLE X

| Base Used to Prepare Drilling Fluid | NaOH Acetic, 1M | | | KOH Acetic, 1M | | | KOH Sulfuric | | |
|---|---|---|---|---|---|---|---|---|---|
| Acid Used to Neutralize Drilling Fluid pH range | AV | PV | YP | AV | PV | YP | AV | PV | YP |
| 9.03–9.07 | 39 | 23 | 32 | 38 | 22 | 33 | 37 | 21 | 33 |
| 8.65–8.67 | 35 | 20 | 30 | 32 | 19 | 27 | | | |
| 8.29 | 33 | 19 | 28 | 30 | 19 | 23 | | | |
| 8.04–8.05 | 31 | 18 | 26 | 29 | 18 | 22 | | | |
| 7.85 | 30 | 18 | 23 | 27 | 17 | 20 | | | |
| 7.73–7.74 | 29 | 18 | 22 | 26 | 16 | 18 | | | |
| 7.47–7.48 | | | | 24 | 16 | 16 | 28 | 17 | 23 |
| 7.31–7.48 | | | | 22 | 15 | 15 | 27 | 17 | 20 |
| 7.06–7.08 | | | | 20 | 14 | 13 | 25 | 16 | 18 |
| 6.81 | | | | 18 | 13 | 10 | | | |
| 6.64 | | | | | | | 22 | 15 | 13 |

EXAMPLE 10

This example demonstrates the effect of decreasing pH on the rheological properties of drilling fluids prepared from water, L-21 latex and Wyoming bentonite (AQUAGEL)®. The data is shown in Table XI below.

TABLE XI

| Bentonite, ppb | 10 | | | 16 | | | 22.5 | | |
|---|---|---|---|---|---|---|---|---|---|
| ALCOGUM L-21, ppb | 0.28 | | | 0.10 | | | 0.004 | | |
| pH Range | AV | PV | YP | AV | PV | YP | AV | PV | YP |
| 9.35 | | | | | | | 31.75 | 19.0 | 18.0 |
| 9.02 | 15.5 | 11.5 | 8.0 | 17.75 | 14.0 | 7.5 | | | |
| 8.41–8.50 | 16.5 | 11.5 | 10.0 | 19.5 | 14.5 | 10.0 | 35.25 | 21.0 | 28.5 |
| 7.67–7.77 | 17.25 | 12.0 | 10.5 | 21.75 | 15.0 | 13.5 | 35.0 | 20.5 | 29.0 |
| 6.73–6.85 | 20.25 | 13.0 | 14.5 | 34.25 | 21.5 | 25.5 | 38.25 | 22.0 | 32.5 |
| 6.26–6.42 | 20.25 | 12.5 | 15.5 | 36.5 | 22.0 | 29.0 | 36.25 | 19.0 | 34.5 |
| 5.83–5.92 | 14.25 | 9.5 | 9.5 | 40.75 | 23.6 | 35.5 | 36.5 | 19.0 | 35.0 |
| 5.21–5.33 | 11.25 | 8.0 | 6.5 | 37.75 | 17.0 | 31.5 | 34.0 | 17.0 | 34.0 |
| 4.90 | | | | 29.5 | 15.5 | 28.0 | | | |

EXAMPLE 11

As can be seen from this example, drilling fluids prepared in accordance with the present invention containing bentonite show relatively stable apparent viscosities even in the presence of differing amounts of various aqueous salt solutions. In all cases, the drilling fluids contained 10 ppb of bentonite. The data in Table XII represents the absolute value of the percent change in the apparent viscosity.

TABLE XII

| Ml. of Salt Solution Added | Latex, ppb. | | Saturated CaSO$_4$ Latex, ppb. | | Saturated KCl Latex, ppb. | | Saturated NaCl Latex, ppb. | | Saturated CaCl$_2$ Latex, ppb. | |
|---|---|---|---|---|---|---|---|---|---|---|
| | 0 | 0.28 | 0 | 0.28 | 0 | 0.28 | 0 | 0.28 | 0 | 0.28 |
| 0 | 0 | 0 | 0 | 0 | 0 | 0 | 0 | 0 | 0 | 0 |
| 1 | 11 | 16 | 0 | 2 | 125 | 44 | 100 | 70 | 245 | 4 |
| 2 | 11 | 23 | 9 | 2 | 225 | 62 | 150 | 68 | 236 | 38 |
| 3 | 33 | | 0 | 0 | 275 | 60 | 170 | 70 | 209 | |
| 4 | | | | | | 56 | 180 | 70 | 200 | |
| 5 | 78 | 5 | 9 | 2 | 338 | | | | | 49 |
| 6 | | | | | | 49 | 180 | 65 | 191 | |
| 7 | | | | | | | | | | |
| 8 | 133 | 7 | 9 | | 400 | | | | | 49 |
| 9 | | | | 12 | | 40 | 180 | 54 | 182 | |
| 10 | | | | | | | | | | |
| 11 | 156 | 7 | 9 | | | | | | | |
| 12 | | | | 14 | 675 | 31 | 180 | 46 | 182 | 49 |
| 13 | | | | | | | | | | |
| 14 | 167 | 7 | 9 | | | | | | | |
| 15 | | | | 16 | | | | | | |
| 16 | | | | | 1263 | 27 | 160 | 38 | 164 | |
| 17 | 178 | 4 | 9 | | | | | | | 55 |
| 18 | | | | 20 | | | | | | |
| 19 | | | | | | | | | | |
| 20 | 189 | 2 | 0 | | 1525 | 31 | 150 | 35 | 164 | |
| 21 | | | | 24 | | | | | | 55 |
| 22 | | | | | | | | | | |
| 23 | 189 | 5 | 9 | | | | | | | |
| 24 | | | | 24 | | | | | | |
| 25 | | | | | 1575 | 36 | 160 | 22 | 145 | 58 |
| 26 | 189 | | 9 | | | | | | | |

EXAMPLE 12

This example shows that the apparent viscosity of drilling fluids prepared in accordance with the present invention remains relatively stable even in the presence of varying amounts of various inorganic salts. In all cases, the drilling fluids were made with water, L-21 latex and contain 10 ppb of bentonite. The data in Table XIII below represent the absolute value of the percent change in the apparent viscosity.

TABLE XIII

| ppb Salt Added | CaSO4 Latex, ppb | | KCl Latex, ppb | | NaCl Latex, ppb | | CaCl2 Latex, ppb | |
|---|---|---|---|---|---|---|---|---|
| | 0 | 0.28 | 0 | 0.28 | 0 | 0.28 | 0 | 0.28 |
| 0 | 0 | 0 | 0 | 0 | 0 | 0 | 0 | 0 |
| 1 | 186 | 24 | 169 | 40 | 129 | 52 | 200 | 4 |
| 5 | 157 | 14 | 823 | 21 | 143 | 26 | 169 | 20 |
| 10 | 129 | 24 | 915 | 26 | 214 | 12 | 131 | 22 |

EXAMPLE 13

In this example are shown the effects of three conventional drilling fluid thinners on the rheological properties of three water-based drilling fluids prepared in accordance with the present invention and employing L-21 latex. The data appears in Table XIV.

TABLE XIV

| Conventional Thinner | ppb. | 10 ppb. Bentonite 0.28 ppb. Latex | | | 16.2 ppb. Bentonite 0.1 ppb. Latex | | | 22.5 ppb. Bentonite 0.004 ppb. Latex | | |
|---|---|---|---|---|---|---|---|---|---|---|
| | | AV | PV | YP | AV | PV | YP | AV | PV | YP |
| BARAPHOS[1] | 0 | 11.0 | 9.0 | 3.5 | 20.0 | 15.0 | 10.0 | 40.0 | 24.5 | 31.0 |
| | 1 | 14.0 | 9.5 | 8.5 | 15.5 | 12.0 | 7.0 | 22.0 | 19.5 | 5.0 |
| | 2 | 13.5 | 10.5 | 6.0 | 13.0 | 11.0 | 4.0 | 18.0 | 16.0 | 3.5 |
| Q-BROXIN[2] | 0 | 6.5 | 5.0 | 3.0 | 19.0 | 17.5 | 2.5 | 34.5 | 20.0 | 29.0 |
| | 1 | 6.0 | 5.0 | 2.0 | 15.0 | 12.0 | 6.0 | 25.5 | 20.5 | 10.0 |
| | 2 | 6.0 | 5.0 | 2.0 | 15.0 | 11.5 | 6.5 | 23.0 | 19.5 | 7.0 |
| CARBONOX[3] | 0 | 9.0 | 6.5 | 4.5 | 14.0 | 11.0 | 6.0 | 35.5 | 21.0 | 29.0 |
| | 1 | 11.0 | 8.5 | 5.5 | 14.5 | 11.0 | 7.0 | 31.0 | 20.5 | 21.5 |
| | 2 | 14.0 | 9.5 | 8.5 | 14.5 | 11.5 | 6.0 | 28.0 | 19.0 | 18.0 |

[1]Brand name of a polyphosphate compound marketed by NL Baroid, Houston, Texas
[2]Brand name of a lignosulfonate marketed by NL Baroid, Houston, Texas
[3]Brand name of an organic humic acid material marketed by NL Baroid, Houston, Texas

EXAMPLE 14

In this example, the effects of three conventional drilling mud fluid loss additives on the rheological properties of three different drilling fluids prepared using water, L-21 latex and bentonite is demonstrated. The results are shown in Table XV below.

TABLE XV

| | ppb | 10 ppb Bentonite 0.28 ppb Latex | | | | 16.2 ppb Bentonite 0.1 ppb Latex | | | | 22.5 ppb Bentonite 0.004 ppb Latex | | | |
|---|---|---|---|---|---|---|---|---|---|---|---|---|---|
| | | AV | PV | YP | FL | AV | PV | YP | FL | AV | PV | YP | FL |
| DEXTRID[1] | 0 | 10.5 | 8.5 | 4.0 | | 17.5 | 13.5 | 8.0 | | 34.0 | 20.0 | 28.5 | |
| | 1 | 17.0 | 14.5 | 5.5 | 10.5 | 31.0 | 26.5 | 9.5 | 9.8 | 55.0 | 31.0 | 48.5 | 9.8 |
| CYPAN[2] | 0 | 7.0 | 5.5 | 2.5 | | 18.5 | 13.0 | 11.0 | | 32.5 | 19.0 | 27.0 | |
| | 1 | 32.5 | 21.5 | 22.0 | 9.4 | 53.5 | 34.0 | 39.0 | 7.8 | 112.0 | 54.5 | 73.5 | |
| CELLEX[3] | 0 | 10.5 | 8.5 | 4.0 | | 18.0 | 14.0 | 8.5 | | 31.0 | 17.5 | 26.5 | |
| | 1 | 40.5 | 27.5 | 26.0 | 9.4 | 73.5 | 46.0 | 55.0 | 6.8 | 112.0 | 64.5 | 95.5 | 6.3 |

[1]Brand name of a processed polysaccharide of enhanced bacterial stability marketed by NL Baroid, Houston, Texas
[2]Brand name of a polyacrylamide marketed by NL Baroid, Houston, Texas
[3]Brand name of a carboxymethylcellulose marketed by NL Baroid, Houston, Texas

EXAMPLE 15

This example demonstrates the use of another type of latex in preparing drilling fluids according to the present invention. The latex employed had a composition in accordance with the teachings of the present invention, i.e. contained at least one carboxylic acid monomer and at least one other, non-carboxylated polymerizable monomer and was produced in an emulsion polymerization process. The latex, known as PARAGUM 503, is manufactured and sold by ParaChem Southern, Inc., and was present in the drilling fluid in an amount to provide 0.5 ppb of polymer solids. The change in rheological properties with changing pH is shown by the data presented in Table XVI below.

TABLE XVI

| pH | AV | PV | YP |
|---|---|---|---|
| 4.33 | 1.0 | 1.0 | 0 |
| 5.61 | 1.25 | 1.0 | 0.5 |
| 7.47 | 1.25 | 1.0 | 0.5 |
| 7.75 | 1.75 | 1.5 | 0 |
| 7.88 | 12.5 | 11.0 | 3.0 |
| 8.01 | 16.0 | 14.0 | 4.0 |
| 9.32 | 16.5 | 14.0 | 5.0 |
| 10.10 | 14.25 | 11.5 | 5.5 |
| 10.70 | 11.0 | 10.0 | 2.0 |
| 11.39 | 6.25 | 6.0 | 0.5 |
| 12.09 | 3.0 | 3.0 | 0 |

EXAMPLE 16

This example illustrates the rheological and filtrate control properties of drilling fluids prepared using various emulsion polymerized, alkali sensitive latexes having the required general composition(s) described above. The PARAGUM latexes are manufactured and sold by ParaChem Southern, Inc. The TYCHEM latexes are emulsion polymerized latexes comprised of styrene/butadiene/maleic anhydride terpolymers manufactured and sold by Reichold Chemicals, Inc. The ALCOGUM latexes, as previously noted, are manufactured and sold by Alco Chemical Corporation. In all cases, the drilling fluids were prepared using the various latexes in amounts so as to provide a water dispersion of the latex containing 0.5 ppb of polymer solids. The results are shown in Table XVII below.

TABLE XVII

| Latex | pH | AV | PV | YP | API Filtrate |
|---|---|---|---|---|---|
| PARAGUM 500 | 8.52 | 7 | 7 | 0 | N.C.[1] |

TABLE XVII-continued

| Latex | pH | AV | PV | YP | API Filtrate |
|---|---|---|---|---|---|
| PARAGUM 501 | 8.46 | 16.5 | 11 | 11 | N.C. |
| PARAGUM 503 | 8.63 | 17.5 | 15 | 5 | N.C. |
| TYCHEM 68-700 | 8.53 | 1.5 | 1.5 | 0 | N.C. |
| TYCHEM 68-704 | 8.48 | 2 | 2 | 0 | N.C. |
| TYCHEM 68-706 | 8.51 | 2.5 | 3 | −1 | N.C. |
| TYCHEM 68-710 | 8.30 | 1.75 | 0.5 | 0.5 | N.C. |
| ALCOGUM L-11 | 7.8 | 3.75 | 2.5 | 2.5 | N.C. |
| ALCOGUM L-15 | 8.5 | 6.0 | 5.5 | 1.0 | N.C. |
| ALCOGUM L-31 | 8.57 | 12.0 | 10.0 | 4.0 | N.C. |
| ALCOGUM L-21 | 8.5 | 22.25 | 15.0 | 14.5 | N.C. |

[1] No filtrate control

EXAMPLE 17

This example illustrates that drilling fluids in accordance with the present invention which contain argillaceous materials display a synergism in regard to rheological properties as well as filtrate control. The drilling fluid formulations of this example were made from water, L-21 latex and bentonite. Three series of data are presented. Table XVIII shows the results obtained on drilling fluids containing only latex. Table XIX shows drilling fluids prepared using only bentonite as the clay while Table XX shows drilling fluids prepared with various amounts of the latex and bentonite. It can readily be seen from comparing the data in Table XX, on one hand, with the data in Table XVIII and Table XIX, on the other hand, that drilling fluids incorporating both the alkali sensitive latexes and the clay exhibit unexpected and synergistic results. Note for example that drilling fluids containing only latex exhibit no filtrate control. (See Table XVIII). Drilling fluids containing clay but none of the alkali sensitive L-21 latex, do, however, display some filtrate control (See Table XIX). However, in every case, the filtrate control exhibited by drilling fluids containing both L-21 latex and clay is greater than would be expected merely from the additive properties of the drilling fluid containing only latex and the drilling fluid containing only clay (See Table XX).

TABLE XVIII

| Latex ppb | Clay ppb | AV | PV | YP | Gel Strength 10 sec. | Gel Strength 10 min. | API Filtrate |
|---|---|---|---|---|---|---|---|
| 0.01 | 0 | 1.25 | 1.5 | −0.5 | 0 | 0 | N.C. |
| 0.02 | 0 | 1.5 | 1.0 | 1.0 | 0 | 0 | N.C. |
| 0.10 | 0 | 3.75 | 3.5 | 0.5 | 0 | 0 | N.C. |
| 0.10 | 0 | 4.0 | 3.0 | 2.0 | 0 | 0 | N.C. |
| 0.21 | 0 | 7.5 | 6.0 | 3.0 | 0 | 0 | N.C. |
| 0.50 | 0 | 21.0 | 15.0 | 12.0 | 0.5 | 0.5 | N.C. |
| 0.50 | 0 | 23.25 | 16.5 | 13.5 | 0 | 0 | N.C. |

TABLE XIX

| | | | | | | | |
|---|---|---|---|---|---|---|---|
| 0 | 3 | 1.25 | 1.0 | 0.5 | 0 | 0 | 51 |
| 0 | 6 | 1.5 | 2.0 | 1.0 | 0 | 0 | 36 |
| 0 | 9 | 2.5 | 2.5 | 0 | 0 | 0 | 27.5 |
| 0 | 10 | 2.5 | 2.5 | 0 | 0 | 0 | 26.5 |
| 0 | 12 | 3.25 | 3.0 | 0.5 | 0 | 0.5 | 17 |
| 0 | 15 | 5.0 | 5.0 | 0 | 0 | 0.5 | 23 |
| 0 | 18 | 7.25 | 6.5 | 1.5 | 0 | 5 | 17 |
| 0 | 21 | 11.75 | 8.5 | 6.5 | 1 | 18 | 13 |
| 0 | 24 | 15.0 | 12.0 | 7.0 | 3 | 22 | 12.5 |
| 0 | 10 | 3.25 | 2.5 | 1.5 | 1 | 1 | 21.1 |

TABLE XX

| Latex ppb | Clay ppb | AV | PV | YP | Gel Strength 10 sec. | Gel Strength 10 min. | API Filtrate |
|---|---|---|---|---|---|---|---|
| 0.01 | 10 | 5.25 | 4 | 2.5 | 1 | 3 | 19.3 |
| 0.02 | 10 | 5.5 | 4.5 | 2 | 1 | 1 | 18.2 |
| 0.10 | 3 | 2.75 | 2.50 | 0.5 | 0 | 0 | 24.0 |
| 0.10 | 6 | 3.5 | 3.0 | 1.0 | 0 | 0 | 17.4 |
| 0.10 | 9 | 5.0 | 4.0 | 2.0 | 0 | 0 | 14.5 |
| 0.10 | 12 | 9.0 | 7.0 | 4.0 | 0.5 | 0.5 | 13.0 |
| 0.10 | 15 | 12.5 | 10.5 | 4.0 | 0.5 | 1.0 | 12.1 |
| 0.10 | 18 | 21.25 | 15.5 | 11.5 | 2 | 4 | 10.7 |
| 0.10 | 21 | 33.5 | 24 | 19 | 4 | 11 | 10.1 |
| 0.10 | 24 | 54 | 36 | 36 | 8 | 29 | 8.8 |
| 0.11 | 10 | 6.75 | 5 | 3.5 | 1 | 1 | 13.9 |
| 0.21 | 10 | 10.25 | 8 | 4.5 | 1 | 1 | 12.6 |
| 0.40 | 5 | 13 | 10 | 6 | 0 | 0.5 | 13.4 |
| 0.50 | 3 | 17 | 19 | 2 | 2 | 2 | 20.2 |
| 0.50 | 4 | 18.25 | 13.5 | 9.5 | 0.5 | 1 | 16.9 |
| 0.50 | 5 | 20.25 | 14.5 | 11.5 | 0.5 | 1.5 | 15.2 |
| 0.50 | 5 | 19 | 12 | 14 | 0 | 0.5 | 15.5 |
| 0.50 | 6 | 22 | 15.5 | 13 | 2 | 3 | 13.9 |
| 0.50 | 6 | 33.5 | 21 | 25 | 4 | 4 | 14.2 |
| 0.50 | 7 | 25 | 17 | 15.5 | 3 | 3.5 | 13.3 |
| 0.50 | 8 | 29 | 19.5 | 19 | 3 | 4 | 12.8 |
| 0.50 | 9 | 27 | 18 | 18 | 4 | 4 | 11.4 |
| 0.50 | 9 | 45.5 | 25 | 41 | 11 | 11 | 13 |
| 0.50 | 12 | 63.3 | 34.5 | 57.5 | 19 | 19 | 9.4 |
| 0.60 | 5 | 28.5 | 20.5 | 16.5 | 1 | 2 | 15.2 |
| 0.70 | 5 | 42.5 | 27 | 31 | 3 | 4 | 15 |
| 0.80 | 5 | 47.5 | 29 | 39 | 1.5 | 3 | 15 |

EXAMPLE 18

In all previous examples, in formulating the drilling fluids, the clay was added to the drilling fluid in the form of an aqueous dispersion, i.e. the clay was pre-dispersed in water and then admixed into the drilling fluid to achieve the desired concentration of clay. This example shows the effect of preparing the drilling fluid by adding dry filtrate control solids to the drilling fluid containing the latex. The drilling fluids used in this example were prepared from water, L-21 latex and contain 0.5 ppb of polymer solids. All samples were neutralized to a pH of about 8.5 with NaOH. When the drilling fluid has been neutralized to the desired pH, the dry, argillaceous material was added with stirring. It can be seen by comparing the data in Table XXI below with data in the previous tables, as for example, Table XX, that incorporation of the dry clay produces much less viscosity enhancement of the drilling fluid than is obtained if the clay is first pre-dispersed in water and the water-clay dispersion added to the drilling fluid.

TABLE XXI

| Argillaceous Material Type | ppb | AV | PV | YP | Gel Strength 10 sec. | Gel Strength 10 min. | API Filtrate |
|---|---|---|---|---|---|---|---|
| None | 0 | 21.0 | 15.0 | 12.0 | 0.5 | 0.5 | N.C. |
| Mica (<325 mesh) | 7 | 20.9 | 14.0 | 13.0 | 0 | 0 | 17.4 |
| Wyoming Bentonite | 10 | 26.0 | 19.5 | 14.0 | 1.5 | 1.5 | 12.1 |
| Glen Rose Shale | 10 | 9.5 | 7.5 | 4.0 | 0 | 0 | 14.6 |

To demonstrate the effectiveness of the drilling fluids and methods of the present invention under actual borehole drilling operations, the following examples are presented.

EXAMPLE 19

This example demonstrates the use of the drilling fluids and methods of the present invention in connection with the drilling of a uranium well. Fifteen pounds of dry, caustic soda were aded to a mud pit containing approximately 778 gallons of water. As the caustic-water solution was circulated, approximately 15 gallons of L-21 latex were added. Approximately one gallon of a defoamer was initially added to control frothing in the pit during the mixing operation. An additional 778 gallons of water was then added to the pit. The L-21 latex which was initially milky white turned clear immediately upon being mixed into the caustic-water solution to produce a viscous drilling fluid yielding a funnel viscosity of 31.5 seconds. The initial pH of the drilling fluid at commencement of drilling was approximately 8 and equilibrated at 7.5 when the drilling had reached 40–50 ft. depths. Samples of the drilling fluid were taken every ten ft. to a depth of 210 ft. The final depth of the borehole was approximately 340 ft.

During the drilling, it was observed that the drilled formation clays or solids did not disperse as readily as when water alone was used as the drilling fluid. Drilling formation solids readily flocculated and settled out in the pit.

An offset borehole drilled previously, 20 ft. away and using only water, produced substantial problems due to dispersion of formation clays. Indeed, it was found that the mud pit had to be jetted twice at 180 and 240 ft. intervals. The results of tests on the drilling fluid at 10 ft. intervals are shown in Table XXII below.

TABLE XXII

| (Ft.) Depth | (Secs.) Funnel Viscosity | Density Pds./Gal. | % Solids | API Filtrate |
|---|---|---|---|---|
| Surface | 31.5 | 8.3 | 0.62 | 52.5 |
| 10 | 31.5 | 8.35 | 2.33 | 18.5 |
| 20 | 31.5 | 8.4 | 2.43 | 16.0 |
| 30 | 30.4 | 8.4 | 3.22 | 17.3 |
| 40 | 31.2 | — | — | — |
| 50 | 29.8 | 8.5 | 4.86 | 16.8 |
| 60 | 30.0 | 8.5 | 3.79 | 17.1 |
| 70 | 31.0 | 8.45 | 3.60 | 15.4 |
| 80 | 30.0 | 8.5 | 2.90 | 15.6 |
| 90 | 29.6 | 8.5 | 3.97 | 13.6 |
| 100 | 30.6 | 8.5 | 3.00 | 12.4 |
| 110 | 30.0 | 8.3 | 4.85 | 11.6 |
| 120 | 29.9 | 8.3 | 6.07 | 11.2 |
| 130 | 29.0 | 8.5 | 4.72 | 12.0 |
| 140 | 29.0 | 8.55 | 5.32 | 29.2 |
| 150 | 28.2 | 8.5 | 5.70 | 12.0 |
| 160 | 27.4 | 8.45 | 5.77 | 11.2 |
| 170 | 28.4 | 8.55 | 6.82 | 12.2 |
| 180 | 30.8 | 8.65 | 5.68 | 15.4 |
| 190 | 27.9 | 9.0 | 15.19 | 9.1 |
| 200 | 29.0 | 8.9 | 14.87 | 9.5 |
| 210 | 31.4 | 9.25 | 17.49 | 7.8 |
| 220 | 30.0 | 8.8 | 12.32 | 10.8 |
| 230 | 29.8 | 8.95 | 15.32 | 10.2 |
| 240 | 30.0 | 8.8 | 13.99 | 11.1 |
| 250 | 30.6 | 9.05 | 15.15 | 9.4 |
| 260 | 31.5 | 9.45 | 22.82 | 14.8 |
| 270 | 31.0 | 9.6 | 24.14 | 18.8 |
| 280 | 34.0 | 9.7 | 26.23 | 19.4 |

EXAMPLE 20

In this example, a 60 foot uranium coring was conducted using substantially the same drilling fluid used in Example 19. Samples of the drilling fluid were taken every 10 minutes of the drilling time and the physical properties measured. The results are shown in Table XIII below.

TABLE XIII

| Time | Drilling Time In Minutes | Funnel Visc. (sec.) | pH | Density | % Solids | Fluid Loss |
|---|---|---|---|---|---|---|
| 1:00 p.m. | Surface | 33.4 | 10 | 8.3 | .93 | 44.0 |
| 1:19 p.m. | 10 | 33.8 | 7 | 8.75 | 9.68 | — |
| 1:29 p.m. | 20 | 33.0 | 9 | 8.5 | 6.13 | 11.0 |
| 1:39 p.m. | 30 | 34.0 | 9 | 8.55 | 4.52 | 12.8 |
| 2:15 p.m. | 40 | 33.2 | 8 | 8.3 | 5.01 | 12.95 |
| 2:25 p.m. | 50 | 33.4 | 8 | 8.65 | 8.12 | 10.8 |
|  | 60 |  |  | 8.8 |  | 10.3 |

The data in Examples 19 and 20 demonstrate the ease of preparing the drilling fluids of the present invention and the rapidity with which desired high viscosity drilling fluids can be prepared at the drilling site. The data in Examples 19 and 20 also show that the A.P.I. filtrate decreased early in the drilling history as formation solids were picked up by the drilling fluid thus effecting the in situ preparation of drilling fluids exhibiting good filtrate content.

EXAMPLE 21

A drilling fluid prepared in accordance with the teachings of the present invention was used in the drilling of a 640 ft. deep, 12¼" diameter surface hole through surface clays, blue-gray gumbo and several gravel and water sands. The drilling fluid was prepared as follows: to a mud pit provided with agitation was added 300 barrels of fresh water. 130 gallons of L-21 latex (approximately 225 lbs. of polymer solids) was added, in five gallon increments, directly into the mud pit. Five gallons of a defoamer was added followed by 50 lbs. of dry caustic which resulted in a drilling fluid having a pH of approximately 8.4. It required only 25–30 minutes to complete preparation of the drilling fluid.

When the borehole depth reached 500 ft., AQUA-GEL$^R$, a bentonite, was added, at a concentration of approximately 3 ppb, to increase the viscosity as some of the latex had been consumed in building volume due to lost circulation and no latex was available.

At 580 ft., BAROID, a barite weighting agent, was added to raise the weight of the mud to 9.4 lbs. per barrel. The addition of the barite weighting agent resulted in no adverse effects on the driling fluid.

Following the drilling, 625 ft. of 8⅝" casing was set. Cementing was performed using the drilling fluid with no adverse effect on curing time or strength of the cement.

During the drilling, several water sands and gravel sections were encountered between 300 ft. to 360 ft. and again at 520 ft. to 540 ft. Excellent hole cleaning was provided by the fluid, no drilling problems being encountered from these formations.

Fluid losses encountered during the drilling operation due to mistaken dumping and lost circulation amounted to approximately 200 barrels. Replacement of lost fluids was rapidly and easily accomplished, with no lost drilling time, simply by the further addition of water, L-21 latex and sufficient caustic. It was observed that lost circulation zones were able to support the added weight of cement during the surface casing cementing operations which suggest that the drilling fluid successfully "healed" the lost circulation zones without the addition of lost circulation material. Table XXIV below shows the results of physical measurements conducted on the drilling fluid at 30 ft. intervals.

TABLE XXIV

| Depth | Funnel Viscosity sec./qt. | Mud Wt. #/Gal. | PV | YP | API Filtrate | Cake Thickness 1/32" | Percent Sol By Weight | AV | Viscosity (300 rpm) | Gel Strengths |
|---|---|---|---|---|---|---|---|---|---|---|
| 0   | 36 | 8.3 | 6  | 3   | NC  | —   | 00.7  | 15 | 9  | 0/0  |
| 30  | 35 | 8.3 | 7  | 7   | 9.0 | <1  | 201.7 | 21 | 14 | 0/0  |
| 60  | 34 | 8.4 | 7  | 5   | 9.0 | <1  | 204.7 | 19 | 12 | 0/0  |
| 90  | 35 | 8.4 | 7  | 7   | 7.0 | <1  | 204.6 | 21 | 14 | 0/0  |
| 120 | 37 | 8.5 | 12 | 11  | 6.1 | <1  | 208.1 | 35 | 23 | 0/3  |
| 150 | 36 | 8.6 | 14 | 11  | 5.0 | <1  | 210.2 | 39 | 25 | 0/4  |
| 180 | 36 | 8.6 | 14 | 7   | 5.5 | <1  | 213.0 | 35 | 21 | 0/4  |
| 210 | 36 | 8.6 | 18 | 8   | 6.2 | <1  | 213.0 | 44 | 26 | 0/7  |
| 240 | 38 | 8.8 | 19 | 6   | 5.0 | <1  | 217.0 | 44 | 25 | 0/8  |
| 270 | 37 | 8.9 | 15 | 5   | 4.0 | <1  | 219.0 | 35 | 20 | 3/10 |
| 300 | 36 | 8.1 | 15 | 3   | 4.8 | <1  | 218.0 | 33 | 18 | 2/10 |
| 330 | 36 | 9.2 | 15 | 3   | 5.0 | <1  | 224.0 | 33 | 18 | 3/10 |
| 360 | 33 | 9.1 | 11 | 9   | 6.1 | <1  | 212.0 | 31 | 20 | 4/8  |
| 390 | —  | —   | —  | —   | —   |     |       |    |    |      |
| 420 | 36 | 9.1 | 10 | 8   | 6.2 | <1  | 214.0 | 28 | 18 | 3/9  |
| 450 | 36 | 9.1 | 8  | 7   | 8.1 | <1  | 214.0 | 23 | 15 | 3/8  |
| 480 | 41 | 9.2 | 12 | 8   | 6.0 | <1  | 216.0 | 32 | 20 | 2/12 |
| 510 | 38 | 9.2 | 13 | 12  | 5.8 | <1  | 216.0 | 38 | 25 | 5/15 |
| 540 | 40 | 9.2 | —  | —   | —   | —   | —     | —  | —  |      |
| 570 | 41 | 9.2 | 17 | 14  | 6.2 | <1  | 218.0 | 48 | 31 | 6/22 |
| 600 | 43 | 9.4 | 16 | 14  | 6.4 | <1  | 223.0 | 46 | 30 | 5/18 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalence of the claims are therefore intended to be embraced therein.

We claim:

1. In a method for drilling a borehole wherein a drilling fluid is circulated within said borehole while drilling, the improvement comprising circulating in said borehole an aqueous composition comprising an effective amount of an emulsion polymerized polymer in water latex consisting of (1) an interpolymer of an olefinically unsaturated carboxylic acid monomer selected from the group consisting of acrylic acid, methacrylic acid and mixtures thereof and at least one other non-carboxylated polymerizable monomer having the general formula:

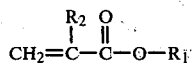

wherein $R_1$ is a member of the class consisting of alkyl groups having from 1 to 30 carbon atoms and $R_2$ is hydrogen or a methyl group, said interpolymer having a molecular weight of from about 1,000,000 to about 4,000,000, and (2) water the API apparent viscosity of an aqueous dispersion of said latex containing 0.5 lbs. of polymer solids per barrel of said dispersion in a pH range above about 6 being at least 600% greater than the API apparent viscosity of said mixture in a pH range below about 6, the pH of said aqueous composition being above about 7, said latex serving to viscosify said drilling fluid without the addition of a clay viscosifier.

2. The method of claim 1 wherein said aqueous composition comprises fresh water.

3. The method of claim 1 wherein said aqueous composition comprises up to 2 lbs. of polymer solids per barrel of said aqueous composition.

4. The method of claim 1 wherein said carboxylic acid is present in said interpolymer in an amount of from about 10 to about 70% by weight.

5. The method of claim 1 wherein said non-carboxylated polymerizable monomer is present in said interpolymer in an amount of from about 30 to about 80% by weight.

6. The method of claim 1 wherein said non-carboxylated polymerizable monomer is selected from the class consisting of methyl acrylate, ethyl acrylate, methyl methacrylate and mixtures thereof.

7. The method of claim 1 wherein said aqueous composition includes sufficient suspended, finely divided solids to form a filter cake on the wall of said borehole.

8. The method of claim 7 wherein said finely divided solids comprise an argillaceous material.

9. The method of claim 1 wherein said aqueous composition includes an indicating amount of an acid-base indicator, said indicator being of a type which undergoes a color change in said aqueous mixture at about the pH where the apparent viscosity is about at least 150% greater than the apparent viscosity of said mixture in a pH range below about 6.

10. The method of claim 1 including the further step of reducing the pH of said aqueous composition below about 7 and circulating said aqueous composition within said borehole.

11. A method of preparing a water-based drilling fluid useful in drilling a borehole comprising:
incorporating into an aqueous carrier an effective amount of an emulsion polymerized polymer in water latex consisting of (1) an interpolymer of an olefinically unsaturated carboxylic monomer selected from the class consisting of acrylic acid, methacrylic acid and mixtures thereof and at least one other, non-carboxylated polymerizable monomer having the general formula:

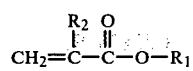

wherein $R_1$ is a member of the class consisting of alkyl groups having from 1 to 30 carbon atoms and $R_2$ is hydrogen or a methyl group, said interpolymer having a molecular weight of from about 1,000,000 to about 4,000,000, and (2) water, the apparent API viscosity of an aqueous dispersion of said latex containing 0.5 lbs. of polymer solids per barrel of said mixture in a pH range above about 6 being at least 600% greater than the API apparent viscosity of said dispersion in a pH range below about 6, said latex serving to viscosify said drilling fluid without the addition of a clay viscosifier;

adding to said aqueous carrier-latex composition a basic material in an amount such that the pH of said aqueous carrier-latex composition is at least about 7; and incorporating in said aqueous carrier-latex composition a sufficient amount of suspended, finely divided solids to form a filter cake on the wall of said borehole.

12. The method of claim 11 wherein said aqueous carrier comprises fresh water.

13. The method of claim 11 wherein said aqueous carrier-latex composition comprises up to 2 lbs. of polymer solids per barrel of said aqueous composition.

14. The method of claim 11 wherein said carboxylic acid is present in said interpolymer in an amount of from about 10 to about 70% by weight.

15. The method of claim 11 wherein said non-carboxylated polymerizable monomer is present in said interpolymer in an amount of from about 30 to about 80% by weight.

16. The method of claim 11 wherein said non-carboxylated polymerizable monomer is selected from the class consisting of methyl acrylate, ethyl acrylate, methyl methacrylate and mixtures thereof.

17. The method of claim 11 wherein said finely divided solids comprise an argillaceous material.

18. The method of claim 11 including incorporating in said carrier-latex aqueous composition an indicating amount of an acid-base indicator, said indicator being of a type which undergoes a color change in said aqueous dispersion at about the pH where the API apparent viscosity is about at least 150% greater than the API apparent viscosity of said dispersion in a pH range below about 6.

19. The method of claim 11 wherein said basic material is selected from the class consisting of alkali metal hydroxides, ammonium hydroxide, sodium carbonate, diammonium phosphate and mixtures thereof.

* * * * *